June 2, 1931.  F. SÖNNICHSEN ET AL  1,808,122
MANUFACTURE OF TUBES AND PIPES
Filed Sept. 18, 1928
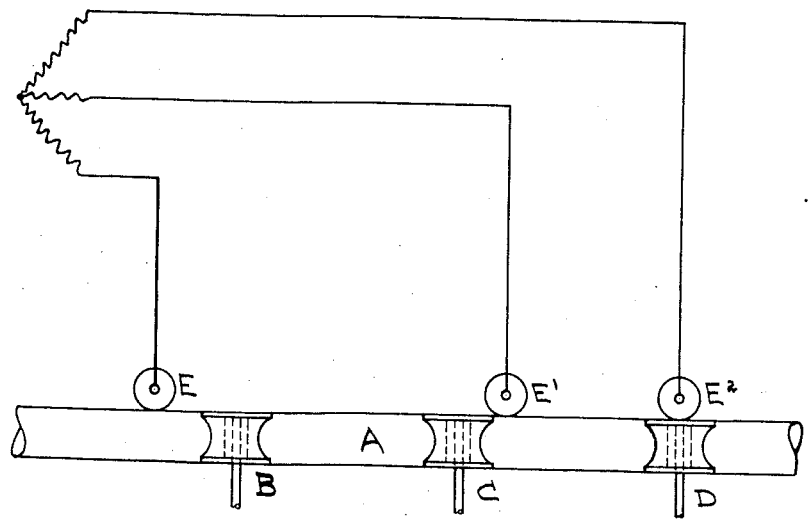
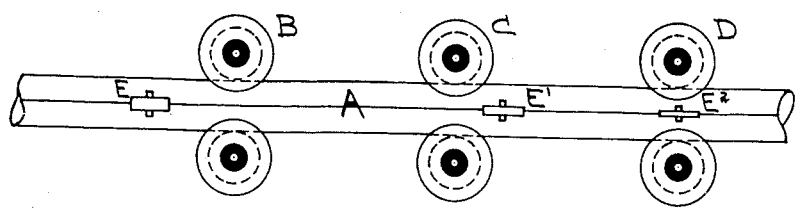
F. Sönnichsen
F. A. Frisch &
H. A. Nicolaysen
INVENTORS
By: Marks & Clerk
ATT'YS.

Patented June 2, 1931

1,808,122

UNITED STATES PATENT OFFICE

FRANCIS SÖNNICHSEN, FRANCIS ADOLF FRISCH, AND HERMAN ARTHUR NICOLAYSEN, OF OSLO, NORWAY

MANUFACTURE OF TUBES AND PIPES

Application filed September 18, 1928, Serial No. 306,741, and in Norway August 11, 1928.

Our invention relates to the manufacture of tubes and pipes and more particularly to the well known process of making these articles from a strip of metal in a continuous operation, first forming a tube blank by folding the strip longitudinally by a suitable rolling machine and thereupon welding together by electrically generated heat along the so formed open seam the two adjacent edges of the metal.

Various methods and devices have been proposed to carry out this welding process in a convenient and reliable manner, most of which making use of electrodes in the form of rollers so disposed relatively to the work-piece that the slit in the pipe to be welded passes the electric flux or the path of the current between said electrodes at right angles with the same. Devices have also been proposed in which path of the current is more or less in alignment with the seam.

Our invention relates to the latter class of devices and is limited to the use of electrodes so disposed relatively to the seam that the electric current path runs along the seam, parallel the same, the work-piece being for the rest wholly outside of the electric flux or the current path. From this reason it is an important point when carrying out our invention to keep the piece of tubing under treatment by the electric current wholly insulated (electrically) from the feeding and pressing mechanism in operation in close proximity to the seam or welding region. We have also found that it is of peculiar advantage to make use of alternating current and preferably of a three-phase-system.

A special feature in our invention is to provide a comparatively long working region for the welding current, so that the metal is gradually heated to its maximum, viz. to the suitable welding temperature. Hereby is attained that the tube may be passed through the machine at great speed and that a suitable uniform heating of the tube all round takes place by way of conduction from the strongly heated seam. This has proved to be of great importance for obtaining a strong product, which can stand all kind of stresses not only caused by internal pressure but also by bending operations and torsions. If by the welding process the tube is exposed to very uneven heating, this may result in faults in the welded seam on account of contraction forces raised in other parts of the tube. We have found that by performing the welding operation in the manner described by us the product obtains a strength which in all respects is equal to that of a drawn tube.

In the accompanying drawings showing diagrammatically how we prefer to carry out the invention, Figure 1 is a plan view and Figure 2 is a side elevation of the device. A is the tube blank, B, C and D, supporting feeding and pressure rollers, all of which are electrically insulated from their carriers and driving mechanisms; E, E' and $E^2$ are electrodes in the form of rollers connected in suitable manner to a three-phase current system. Said rollers are adjustably mounted so that the distance between them can easily be varied. Preferably the distance between E and E' is much greater than between E' and $E^2$. Preferably the roller electrode $E^2$ has a very narrow contact surface with the tube, the roller E' a somewhat wider and the roller E the widest. All of the rollers are in contact with both sides of the seam. There may as will be understood in this manner be established two electric current paths of different character.

At the point of contact of the roller E there will be an electric current of less intensity than at the contact point of the roller $E^2$ thereby obtaining a gradually increasing heat along a considerable long part of the seam.

In the example described 3-phase current has been supposed to be used. In some cases a two-phase current may be used, especially by welding pipes of small diameter.

As will be understood from the foregoing the points at which current is fed to the tube are according to the invention always and only lying in the same line. The long line or path of heating will result in a sufficiently uniform heating of the whole pipe section to avoid undesirable contraction effects and to ensure an effective action of the roller press.

Claims.

1. Apparatus for welding by a continuous operation tube blanks formed out of a folded up strip of metal, comprising means to pass the tube blank, electrically insulated from the feeding mechanism, into successive contact with a series of electrodes forming the terminals of a poly-phase current system, said electrodes having a contact surface with the tube blank covering both sides of the slit to be welded, the contact surface of successive electrodes being narrower than that of preceding electrodes.

2. An electric welding machine for tubes having a longitudinal slit, comprising a series of pairs of feed rollers, electrical means for gradually heating in the direction of feed the abutting edges of said slit from red heat between the first two pairs of said rollers to welding heat adjacent the last pair of rollers in the series, said means including a source of electric current and a circuit therefor, a plurality of terminals in the circuit positioned in decreasing, spaced relation to each other in the direction of feed and in contact with said edges.

3. An electric welding machine for tubes having a longitudinal slit, comprising a series of pairs of feed rollers, electrical means for furnishing gradient steps of heating the abutting edges of said slit from red heat between the first two pairs of said rollers to welding heat adjacent the last pair of rollers in the series, said means including a source of electric current and a circuit therefor, a plurality of terminals in the circuit in contact with both edges of said slit supplying a continuous flow of multiple phase current, said terminals being positioned in decreasing, spaced relation to each other in the direction of feed and in contact with said edges.

4. An electric welding machine for tubes having a longitudinal slit, comprising a series of pairs of feed rollers, electrical means for furnishing gradient steps of heating the abutting edges of said slit from red heat between the first two pairs of said rollers to welding heat adjacent the last pair of rollers in the series, said means including a source of electric current and a circuit therefor, a plurality of terminals in the circuit positioned in decreasing, spaced relation to each other in the direction of feed and in contact with said edges, said terminals straddling said slit, the preceding terminal being broader than the following terminal.

5. A process of electric seam-welding consisting in feeding a workpiece in one direction with the edges thereof to be welded in abutment, applying gradient steps of electric heating to said edges from red heat to white heat and pressing said edges tightly against each other when at white heat proceeding in said direction, thereby causing them to form a continuous, uninterrupted smooth weld.

6. A process of seam-welding by the use of a multiple phase electric current, consisting in feeding a workpiece in one direction with the edges thereof to be welded in abutment, applying gradient steps of electric heating to said edges from red heat proceeding in said direction to white heat and pressing said edges tightly against each other when at white heat, thereby causing them to form a continuous, uninterrupted smooth weld.

In testimony whereof we have signed our names to this specification.

FRANCIS SÖNNICHSEN.
FRANCIS ADOLF FRISCH.
HERMAN ARTHUR NICOLAYSEN.